US012561724B2

(12) United States Patent
Zhang et al.

(10) Patent No.: US 12,561,724 B2
(45) Date of Patent: Feb. 24, 2026

(54) METHOD AND APPARATUS FOR GENERATING RECOMMENDATION REASON, AND STORAGE MEDIUM

(71) Applicants: BEIJING WODONG TIANJUN INFORMATION TECHNOLOGY CO., LTD., Beijing (CN); BEIJING JINGDONG CENTURY TRADING CO., LTD., Beijing (CN)

(72) Inventors: Hainan Zhang, Beijing (CN); Hongshen Chen, Beijing (CN); Zhuoye Ding, Beijing (CN); Yongjun Bao, Beijing (CN); Weipeng Yan, Beijing (CN)

(73) Assignees: BEIJING WODONG TIANJUN INFORMATION TECHNOLOGY CO., LTD., Beijing (CN); BEIJING JINGDONG CENTURY TRADING CO., LTD., Beijing (CN)

( * ) Notice: Subject to any disclaimer, the term of this patent is extended or adjusted under 35 U.S.C. 154(b) by 427 days.

(21) Appl. No.: 18/004,008

(22) PCT Filed: Jun. 25, 2021

(86) PCT No.: PCT/CN2021/102539
§ 371 (c)(1),
(2) Date: Dec. 30, 2022

(87) PCT Pub. No.: WO2022/001896
PCT Pub. Date: Jan. 6, 2022

(65) Prior Publication Data
US 2023/0274332 A1 Aug. 31, 2023

(30) Foreign Application Priority Data

Jul. 1, 2020 (CN) .......................... 202010619641.0

(51) Int. Cl.
*G06Q 30/00* (2023.01)
*G06F 16/3329* (2025.01)
(Continued)

(52) U.S. Cl.
CPC ..... *G06Q 30/0631* (2013.01); *G06F 16/3329* (2019.01); *G06F 16/335* (2019.01)

(58) Field of Classification Search
None
See application file for complete search history.

(56) References Cited

U.S. PATENT DOCUMENTS 10,817,793 B1 * 10/2020 Duckworth ............ G06N 5/045
11,694,281 B1 * 7/2023 Liu ......................... G06F 40/30
704/9
(Continued)

FOREIGN PATENT DOCUMENTS

CN 103914543 A 7/2014
CN 106649761 A 5/2017
(Continued)

OTHER PUBLICATIONS

The Extended European Report dated May 10, 2024 for European Application No. 21832360.8.
(Continued)

*Primary Examiner* — Mila Airapetian

(57) ABSTRACT

The embodiment of the present application provides a method and apparatus for generating a recommendation reason, a device and a storage medium. Content information of an object to be recommended is acquired, and the recommendation reason of the object to be recommended is generated according to a pre-trained recommendation reason generation model and the content information, where the training data used by the recommendation reason generation model includes question-answer data and content informa-
(Continued)

tion of multiple objects. In this technical solution, since the training of the recommendation reason generation model takes the question-answer data and the content information of multiple objects into account, commodities that users care about most are mined through the question-answer data, therefore, the recommendation reason generated by this solution can accurately target users' needs and improve user experience.

13 Claims, 5 Drawing Sheets

(51) Int. Cl.
G06F 16/335 (2019.01)
G06Q 30/0601 (2023.01)

(56) References Cited

U.S. PATENT DOCUMENTS

| | | | |
|---|---|---|---|
| 2002/0133384 A1 | 9/2002 | Dimitruk et al. | |
| 2006/0217962 A1 | 9/2006 | Asano | |
| 2009/0138443 A1 | 5/2009 | Huang et al. | |
| 2012/0233020 A1 | 9/2012 | Eberstadt et al. | |
| 2014/0358635 A1 | 12/2014 | Bao et al. | |
| 2017/0243278 A1* | 8/2017 | Hyde | G06Q 40/06 |
| 2018/0101616 A1* | 4/2018 | Ma | G06F 16/9536 |
| 2018/0114093 A1* | 4/2018 | Hasuko | G06Q 30/0201 |
| 2019/0139118 A1* | 5/2019 | Hyde | G06Q 30/0282 |
| 2019/0228269 A1 | 7/2019 | Brent et al. | |
| 2022/0147845 A1 | 5/2022 | Fu et al. | |
| 2022/0414741 A1* | 12/2022 | Ozcan | G06Q 30/0643 |
| 2024/0232539 A1* | 7/2024 | Venkateshwaran | G06N 3/044 |

FOREIGN PATENT DOCUMENTS

| | | |
|---|---|---|
| CN | 106776568 A | 5/2017 |
| CN | 107609960 A | 1/2018 |
| CN | 107918616 A | 4/2018 |
| CN | 110188182 A | 8/2019 |
| CN | 110457452 A | 11/2019 |
| CN | 110458638 A | 11/2019 |
| CN | 110532463 A | 12/2019 |
| CN | 110990600 A | 4/2020 |
| CN | 112308650 A | 2/2021 |

OTHER PUBLICATIONS

The First Office Action dated Jan. 10, 2022 for Chinese Application No. 202010619641.0.
Sun Fumin et al., "Recommendflow: Use Topic Model to Automatically Recommend Stack Overflow Q&A in IDE," pp. 512-526, Jan. 15, 2020.
International Search Report and Written Opinion dated Sep. 27, 2021 for International Application No. PCT/CN2021/102539.
Long Chen, "Intelligent Text Understanding for Product Reviews," Chinese Selected Doctoral Dissertations and Master's Theses Full-Text Databases (Doctoral), Information Science and Technology, No. 01, Jan. 15, 2020 (Jan. 15, 2020), 1-18, pp. 1138-1162.

* cited by examiner

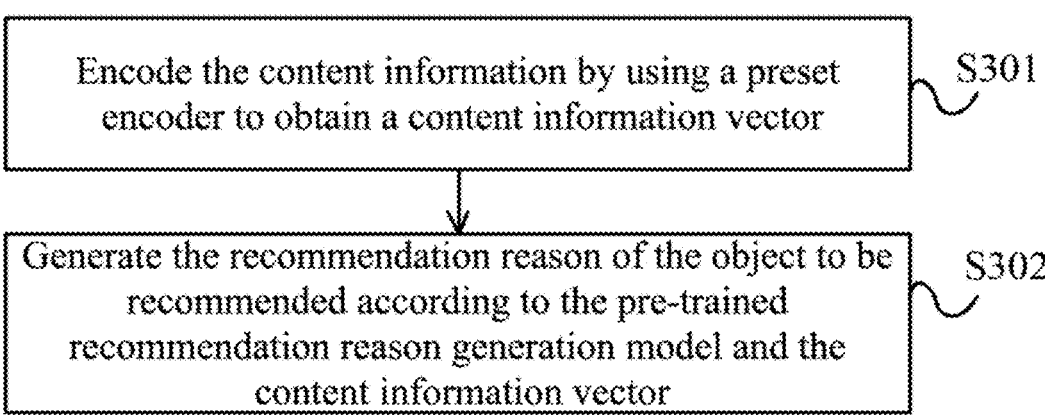

| |
|---|
| Encode the content information by using a preset encoder to obtain a content information vector ~ S301 |
| ↓ |
| Generate the recommendation reason of the object to be recommended according to the pre-trained recommendation reason generation model and the content information vector ~ S302 |

FIG. 3

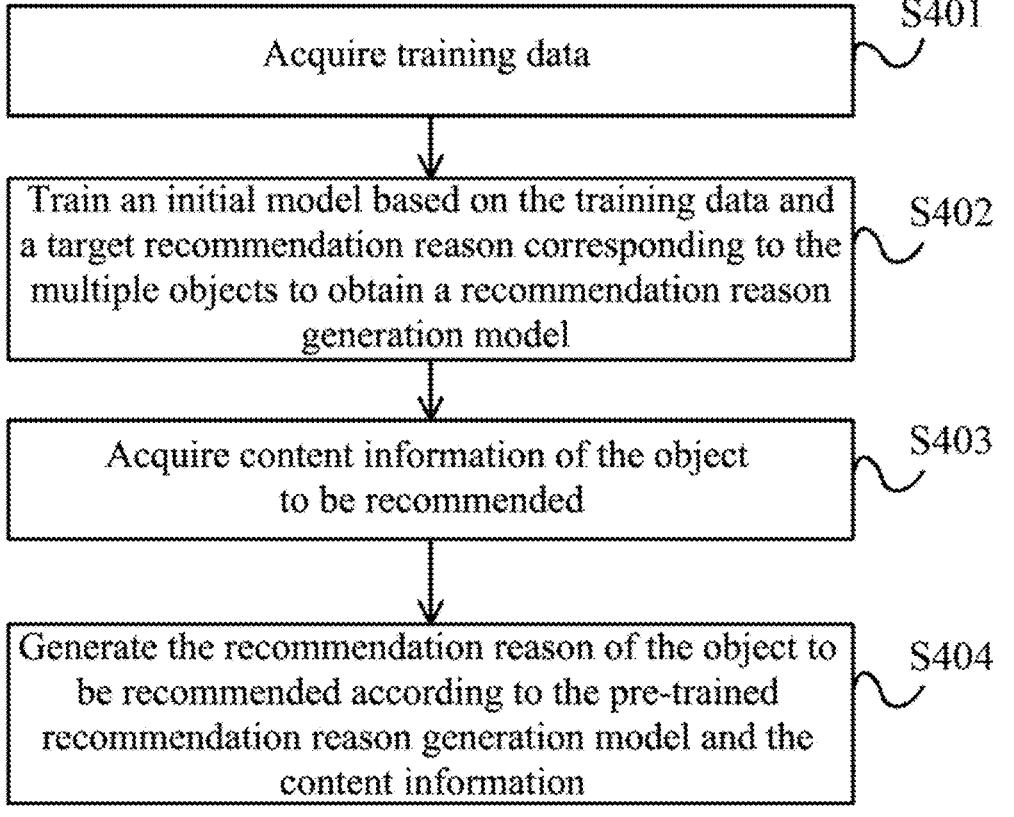

| |
|---|
| Acquire training data ~ S401 |
| ↓ |
| Train an initial model based on the training data and a target recommendation reason corresponding to the multiple objects to obtain a recommendation reason generation model ~ S402 |
| ↓ |
| Acquire content information of the object to be recommended ~ S403 |
| ↓ |
| Generate the recommendation reason of the object to be recommended according to the pre-trained recommendation reason generation model and the content information ~ S404 |

FIG. 4

METHOD AND APPARATUS FOR GENERATING RECOMMENDATION REASON, AND STORAGE MEDIUM

CROSS-REFERENCE TO RELATED APPLICATIONS

The present application is a national stage of International Application No. PCT/CN2021/102539, filed on Jun. 25, 2021, which claims priority to the Chinese Patent Application No. 202010619641.0, filed with the China National Intellectual Property Administration on Jul. 1, 2020 and entitled "METHOD AND APPARATUS FOR GENERATING RECOMMENDATION REASON, DEVICE AND STORAGE MEDIUM", which is incorporated herein by reference in its entirety. Both of the aforementioned applications are hereby incorporated by reference in their entireties.

TECHNICAL FIELD

Embodiments of the present application relate to the field of communication technologies, in particular, to a method and apparatus for generating a recommendation reason, a device and a storage medium.

BACKGROUND

At present, the method of commodity recommendation has been widely studied in academia and has been practically applied in industry. In old e-commerce scenarios, most users would directly search for products they wanted. However, with the rapid development of the economy and the increasing abundance of commodities, more and more users do not know what they need, so they are more accustomed to online shopping based on commodity recommendation.

SUMMARY

Embodiments of the Present Application Provide a Method and Apparatus for Generating a Recommendation Reason, a Device and a Storage Medium.

In a first aspect, an embodiment of the present application provides a method for generating a recommendation reason, including:

acquiring content information of an object to be recommended; and generating the recommendation reason of the object to be recommended according to a pre-trained recommendation reason generation model and the content information, the training data used by the recommendation reason generation model including question-answer data and content information of multiple objects.

In a possible implementation, where the generating the recommendation reason of the object to be recommended according to the pre-trained recommendation reason generation model and the content information may include:

encoding the content information by using a preset encoder to obtain a content information vector; and generating the recommendation reason of the object to be recommended according to the pre-trained recommendation reason generation model and the content information vector.

In a possible implementation, the content information may include a title and an attribute. At this time, where the encoding the content information by using the preset encoder to obtain the content information vector may include:

encoding the title and the attribute by using the preset encoder respectively to obtain a title vector and an attribute vector; and obtaining the content information vector according to the title vector, the attribute vector and a preset weight.

In a possible implementation, before the generating the recommendation reason of the object to be recommended according to the pre-trained recommendation reason generation model and the content information, the method further includes:

acquiring the training data; and training an initial model based on the training data and a target recommendation reason corresponding to the multiple objects to obtain the recommendation reason generation model.

In a possible implementation, where the acquiring the training data includes:

acquiring the content information of the multiple objects;

acquiring the question-answer data of the multiple objects; and filtering the question-answer data and the content information to obtain valid data;

correspondingly, the training the initial model based on the training data and the target recommendation reason corresponding to the multiple objects to obtain the recommendation reason generation model includes:

training the initial model based on the content information of the multiple objects, the valid data and the target recommendation reason corresponding to the multiple objects to obtain the recommendation reason generation model.

In a second aspect, an embodiment of the present application provides an apparatus for generating a recommendation reason, including a memory and a processor:

the memory is configured to store program instructions; and the processor is configured to invoke the program instructions in the memory to:

acquire content information of an object to be recommended; and generate the recommendation reason of the object to be recommended according to a pre-trained recommendation reason generation model and the content information, the training data used by the recommendation reason generation model includes question-answer data and content information of multiple objects.

In a possible implementation, the processor is configured to:

encode the content information by using a preset encoder to obtain a content information vector; and generate the recommendation reason of the object to be recommended according to the pre-trained recommendation reason generation model and the content information vector.

In a possible implementation, the content information includes a title and an attribute. At this time, when being configured to encode the content information by using the preset encoder to obtain the content information vector, the processor is configured to:

encode the title and the attribute by using the preset encoder respectively to obtain a title vector and an attribute vector; and obtain the content information vector according to the title vector, the attribute vector and a preset weight.

In a possible implementation, the processor is further configured to:

acquire the training data; and train an initial model based on the training data and a target recommendation reason corresponding to the multiple objects to obtain the recommendation reason generation model.

In a possible implementation, when being configured to acquire the training data, the processor is configured to:

acquire the content information of the multiple objects;

acquire the question-answer data of the multiple objects;

filter the question-answer data and the content information to obtain valid data;

correspondingly, when being configured to train the initial model based on the training data and the target recommendation reason corresponding to the multiple objects to obtain the recommendation reason generation model, the processor is configured to: train the initial model based on the content information of the multiple objects, the valid data and the target recommendation reason corresponding to the multiple objects to obtain the recommendation reason generation model.

On the basis of any of the above possible implementations:

in a possible implementation, the preset encoder may include at least one of the following encoders: a bidirectional long short-term memory network (LSTM) encoder, a unidirectional LSTM encoder or a transformer model, etc.

In a possible implementation, the initial model may include:

a prior network module, configured to obtain a first recommendation reason according to a content information vector;

a posterior network module, configured to obtain a second recommendation reason according to the content information vector and a question-answer data vector; and a decoding module, configured to obtain a predicted recommendation reason according to the first recommendation reason, the second recommendation reason and a target recommendation reason.

In a possible implementation, the initial model may further include:

a loss function calculating module, configured for at least one of the following purposes:

obtaining a first loss function according to the question-answer data vector and the target recommendation reason, the first loss function being used to indicate to adjust a relevant parameter in the decoding module;

obtaining a second loss function according to the predicted recommendation reason and the target recommendation reason, the second loss function being used to indicate to adjust a relevant parameter in the decoding module; and obtaining a third loss function according to the first recommendation reason and the second recommendation reason, the third loss function being used to indicate to adjust at least one of a relevant parameter in the prior network module and a relevant parameter in the posterior network module.

In a third aspect, an embodiment of the present application provides a non transitory computer readable storage medium on which a computer program is stored: when the computer program is executed, the method according to any one of the first aspect or possible implementations thereof is implemented.

In a fourth aspect, an embodiment of the present application further provides a program product, the program product includes the computer program, the computer program is stored in the readable storage medium, the processor can read the computer program from the readable storage medium, and the processor executes the computer program to perform the method according to any one of the first aspect or possible implementations thereof.

According to the embodiment of the present application provides a method and apparatus for generating a recommendation reason, a device and a storage medium, content information of an object to be recommended is acquired, and the recommendation reason of the object to be recommended is generated according to a pre-trained recommendation reason generation model and the content information, where the training data used by the recommendation reason generation model includes question-answer data and content information of multiple objects. In this technical solution, since the training of the recommendation reason generation model takes the question-answer data and the content information of multiple objects into account, commodities that users care about most are mined through the question-answer data.

BRIEF DESCRIPTION OF DRAWINGS

FIG. 3 is a schematic flowchart of a method for generating a recommendation reason provided by another embodiment of the present application.

FIG. 4 is a schematic flowchart of a method for generating a recommendation reason provided by yet another embodiment of the present application.

DESCRIPTION OF EMBODIMENTS

Figure 1:
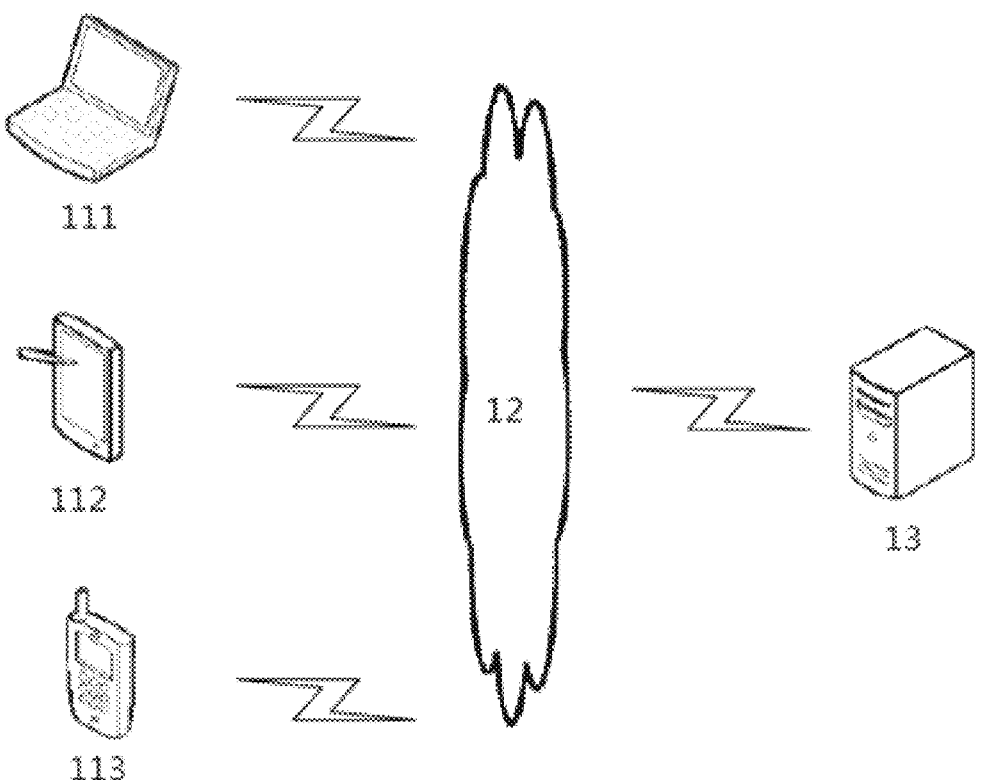
FIG. 1 is an application scenario schematic diagram of a method for generating a recommendation reason provided by the present application.

It should be understood that the "and/or" involved in the embodiments of the present application describes the association relationship of the associated objects, indicating that there may be three kinds of relationships. For example, A and/or B may mean: A alone exists, A and B exist at the same time, and B exists alone, where A and B may be singular or plural. The character "/" generally indicates that the associated objects are in an "or" relationship.

Before introducing the technical solution of the present application, the existing problems in the prior art and the technical conception process of the present application are first introduced in combination with a specific application scenario of the present application.

Exemplarily, in the following, description will be made by applying the method for generating a recommendation reason provided by the present application in commodity recommendation. Specifically, with the rapid development of e-commerce business, online shopping has become a shopping trend. In old e-commerce scenarios, most users would directly search for products they wanted. With the development of the economy and the increasing abundance of commodities, more and more users do not know what they need, so they are more accustomed to online shopping based on recommendation reasons.

Commodity recommendation focuses on how to provide users with better commodity rankings. But at present, only sorting can no longer meet the needs of users. With the increase of time cost, most users prefer to directly see the characteristics of the commodity and the recommendation reason, instead of clicking on the commodity to view the details to get the information they want. Under the limited screen space of electronic devices such as mobile phones, how to directly display the recommendation reason of the commodity and optimize user experience has become an urgent problem that needs to be solved at present.

Moreover, accurate and effective recommendation reason is capable to better attract users' attention and increase users' clicks and purchases. Online analysis shows that through the display of the recommendation reason, the attention of users is quickly caught and the click-through rate of the commodity is increased. In a word, generating an accurate and effective recommendation reason of each commodity is an important and practical issue in e-commerce.

At present, the commonly used method for generating a recommendation reasons mainly include two types.

One only focuses on the commodity itself, and generates a recommendation reason through content information such as a title and an attribute of the commodity. However, it cannot accurately detect the commodity aspect that users care about most, and the commodity content that potential users are eager to know is not displayed, thus affecting the user experience.

The other uses review information of the commodity as a guideline for users' needs to generate a recommendation reason. However, because the review information contains a large number of positive review templates and false positive review information. If these noise data are used to generate the recommendation reason, it will lead to inaccurate targeting of users' needs, thus greatly affecting the validity of the generated recommendation reason, thereby resulting in poor user experience.

Aiming at the above problems, the inventor found through research, and proposed to use question-answer data of a commodity to explore content mining aspects that potential customers want to know. Because the question-answer data reflects the real needs of users, very few users will swipe the screen in the question-answer section, and the question-answer data can more quickly show users' concerns. As a large number of users ask questions about the commodity they are interested in, and the purchased users answer their questions, these question-answer data themselves directly describe the content that users care about.

Specifically, an embodiment of the present application provides a method for generating a recommendation reason. Through learning of content information and question-answer data of a commodity, and using of the question-answer data as a guide, a recommendation reason is generated as assistance of the content information, in this way, the generated recommendation reason allows for effective targeting of users' needs, thus improving user experience.

It should be noted that, in the embodiment of the present application, the object refers to a commodity carried on an e-commerce website, and accordingly, the method for generating a recommendation reason is a process of screening the commodity and recommending the same to the user.

Exemplarily, FIG. 1 is an application scenario schematic diagram of the method for generating a recommendation reason provided by the present application. As shown in FIG. 1, the application scenario may include: at least one terminal device (FIG. 1 shows three terminal devices, namely a terminal device 111, a terminal device 112, and a terminal device 113), a network 12 and a server 13. Where each terminal device and the server 13 can communicate through the network 12.

Exemplarily, when the user browses the e-commerce platform through the terminal device 111, for example, the user can browse the e-commerce platform through the e-commerce APP installed in the terminal device, the terminal device 111 sends an object recommendation request to the server 13 through the network 12, and the server 13 may acquire a user behavior within a preset time period according to a user identifier included in the object recommendation request, and further determine an object to be recommended to the user according to the user behavior, where the object corresponds to a recommendation reason obtained through the method for generating a recommendation reason provided by the present application, and the recommended object and its corresponding recommendation reason are sent to the terminal device 111 used by the user through the network 12, and the terminal device 111 displays the object and its corresponding recommendation reason to the user.

Where the user behavior includes but is not limited to the behavior of purchasing the commodity, the behavior of adding the commodity to a shopping cart, the behavior of browsing the commodity, and so on. Taking the behavior of purchasing the commodity as an example, if the user has purchased a mobile phone in a recent period of time, the server 13 acquires the behavior of the user who has purchased the mobile phone according to the user ID, and further determines to recommend related commodities such as mobile phone films and mobile phone protective covers to the user. At this time, the server 13 obtains the above commodity and its corresponding recommendation reason, and sends them to the terminal device 111, and the terminal device 111 displays the above commodity and its corresponding recommendation reason to the user for the user's view:

It should be noted that FIG. 1 is only an application scenario schematic diagram provided by an embodiment of the present application, and the embodiment of the present application does not limit the devices included in FIG. 1, nor does it limit the positional relationship among the devices in FIG. 1. For example, in the application scenario shown in FIG. 1, a data storage device may also be included, and the data storage device may be an external memory relative to the server 13 or an internal memory integrated in the server 13. In addition, the server 13 may be an independent server, or may be a service cluster or the like.

Hereinafter, the technical solutions of the present application will be described in detail through specific embodiments. It should be noted that the following specific embodiments may be combined with each other, and the same or similar concepts or processes may not be repeated in some embodiments.

Figure 2:
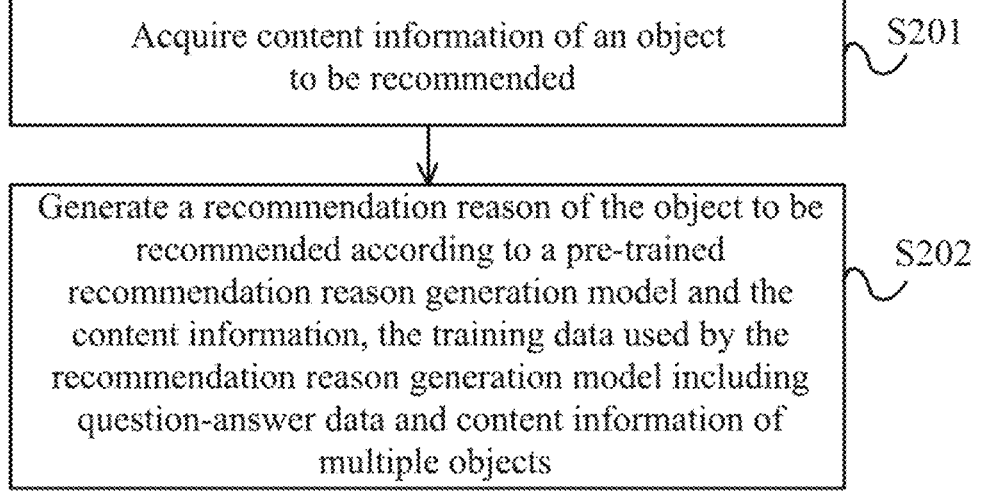
FIG. 2 is a schematic flowchart of a method for generating a recommendation reason provided by an embodiment of the present application.

FIG. 2 is a schematic flowchart of a method for generating a recommendation reason provided by an embodiment of the present application. The method is explained by taking the server in the application scenario shown in FIG. 1 as the execution body. It should be made clear that the execution body of the method for generating a recommendation reason provided by the embodiment of the present application is not limited to the server, as long as it is an electronic device with certain computing power, it can be used as the execution body.

As shown in FIG. 2, the method includes the following steps:

S201, acquiring content information of an object to be recommended.

Exemplarily, in practical applications, when a user logs in to an APP through a terminal device, for example, when logging in to an e-commerce APP, the terminal device sends a request carrying a user ID to the server, and the server obtains the most recent user behavior of the user according to the user ID, and acquires the content information of the object to be recommended based on the user behavior. For example, in a recent period of time, the user has conducted the behavior of adding an object to a shopping cart, the server determines such behavior according to the user ID, and acquires the content information of similar objects according to the behavior.

Alternatively, the server scans each object in its corresponding database, where the database stores various related information of the object, such as the content information, and acquires the corresponding content information.

S202, generating the recommendation reason of the object to be recommended according to a pre-trained recommendation reason generation model and the content information, the training data used by the recommendation reason generation model including question-answer data and content information of multiple objects.

Specifically, the core of recommendation reason generation is selling point mining, and combined with the question-answer data, the recommendation reason generation model is generated based on the content information.

In practical applications, since abundant question-answer data only exists in hot-selling products, it is difficult to obtain enough question-answer data for a large number of non-hot-selling products. When considering to generate a recommendation reason from the question-answer data, it will face the real problem caused by the imbalance of the question-answer data. In the embodiment of the present application, since the training data used by the recommendation reason generation model includes the question-answer data and the content information of multiple objects, the object that the user cares about most is mined through the question-answer data to assist the generation of the recommendation reason of the object. Therefore, for non-hot-selling products, the recommendation reason generation model has learned an attention point of such kinds of products, and an effective recommendation reason can also be generated by simply using the content information.

In the method for generating a recommendation reason provided by the embodiment of the present application, content information of an object to be recommended is acquired, and the recommendation reason of the object to be recommended is generated according to a pre-trained recommendation reason generation model and the content information, where the training data used by the recommendation reason generation model includes question-answer data and content information of multiple objects. In this technical solution, since the training of the recommendation reason generation model takes the question-answer data and the content information of multiple objects into account, commodities that users care about most are mined through the question-answer data, therefore, the recommendation reason generated by this solution can accurately target users' needs, thereby greatly saving labor costs and improving user experience.

On the basis of the above embodiments, in an embodiment, as shown in FIG. 3, where the generating the recommendation reason of the object to be recommended according to the pre-trained recommendation reason generation model and the content information may include:

S301, encoding the content information by using a preset encoder to obtain a content information vector; and S302, generating the recommendation reason of the object to be recommended according to the pre-trained recommendation reason generation model and the content information vector.

In this implementation, the content information is firstly encoded to obtain the content information vector, which can be understood that the encoding process is to convert the content information into a parameter form that can be processed by the recommendation reason generation model, the content information vector is the input parameter of the recommendation reason generation model, and after being processed by the recommendation reason generation model, the recommendation reason corresponding to the object to be recommended is obtained, that is to say, the recommendation reason of the object to be recommended is the output of the recommendation reason generation model.

Where the preset encoder may include at least one of the following encoders: a bidirectional LSTM encoder, a unidirectional LSTM encoder or a transformer model, or the like. The transformer model uses the structure of the full attention mechanism instead of the structure of LSTM, and has achieved better results in translation tasks.

In some embodiments, the content information may include a title and an attribute. In S301, where the encoding the content information by using the preset encoder to obtain the content information vector may include: encoding the title and the =attribute by using the preset encoder respectively to obtain a title vector and an attribute vector; obtaining the content information vector according to the title vector, the attribute vector and a preset weight. It should be noted that, an example is taken where the content information includes the title and the attribute for illustration, but the embodiment of the present application is not limited thereto. For example, in addition to the title and attribute, the content information may also include any information related to the object itself and stored in the data knowledge base.

Exemplarily, the generation process of the recommendation reason is illustrated by the following examples.

1) Setting the content information to include the title and the attribute, where the title is "LED rechargeable night light", the attribute is "Chargeable, Light, Large capacity", and the dimension of the word vector is 128 dimensions. The bidirectional LSTM encoder is configured to perform 256-dimensional encoding processing on the title and the attribute respectively to obtain a 256-dimensional vector corresponding to the title and a 256-dimensional vector corresponding to the attribute, that is, the title vector and the attribute vector, both of which have 256 dimensions.

2) The two 256-dimensional vectors are combined with preset weights, the title vector is multiplied by a preset weight $\lambda$, and the attribute vector is multiplied by $(1-\lambda)$ to obtain a 256-dimensional content information vector, which is used as the vector representation of the content information.

3) The 256-dimensional content information vector is used as input, and the recommendation reason "Small, Convenient and Accommodatable" is generated through the pre-trained recommendation reason generation model.

The practical application of the recommendation reason generation model is introduced in the above embodiment. Next, explanation will be made on how to acquire the recommendation reason generation model, that is, the training process of the recommendation reason generation model.

FIG. 4 is a schematic flowchart of a method for generating a recommendation reason provided by another embodiment of the present application. Referring to FIG. 4, the method for generating a recommendation reason in the embodiment may include:

S401, acquiring training data.

In a possible implementation, in S401, where the acquiring the training data may include: acquiring the content information of the multiple objects: acquiring the question-answer data of the multiple objects; and filtering the question-answer data and the content information to obtain valid data.

For example, the server acquires the content information of multiple objects from the data knowledge base, e.g., information such as an ID, a title and an attribute of a given commodity. In addition, the server collects the question-answer data corresponding to the given commodity, including the question and all answers corresponding to the question and their corresponding likes, etc.

For filtering processing, it is understandable, exemplarily:

starting from the commodity granularity: if the number of questions for the given commodity is less than 3, the processing of the given commodity is "elimination": or, if the number of questions for the given commodity exceeds 70, the top 70 questions and their answers of the given commodity are kept.

Starting from the question granularity corresponding to the commodity: for each commodity, deleting unanswered questions; and/or, if there are more than 20 answers to a question, keeping the top 20 answers.

It should be understood that, for the eliminated commodity, the corresponding content information is also deleted.

For the filtered commodity, manpower is invited to write the target recommendation reason for the commodity, manpower is required to write the target recommendation reason from the perspective of user experience and according to the question-answer data and the content information. Exemplarily, the target recommendation reason is limited to 20 characters.

Finally, the training data and the target recommendation reason corresponding to the multiple objects are obtained.

S402, training an initial model based on the training data and a target recommendation reason corresponding to the multiple objects to obtain a recommendation reason generation model.

Corresponding to the relevant description of S401, this step may include: training the initial model based on the content information of the multiple objects, the valid data and the target recommendation reason corresponding to the multiple objects to obtain the recommendation reason generation model.

S403, acquiring the content information of the object to be recommended.

This step is similar to S201, and the specific description is as described above, which is not repeated here. The execution order of S402 and S403 is not limited in the present application.

S404, generating the recommendation reason of the object to be recommended according to the pre-trained recommendation reason generation model and the content information.

This step is similar to S202, and the specific description is as described above, which is not repeated here.

In the embodiment, after acquiring the training data, where the training data includes the content information and the question-answer data of multiple objects, the question-answer data is filtered to eliminate noise interference and obtain valid question-answer data: further, training the initial model based on the content information of the multiple objects, the valid question-answer data and the target recommendation reason corresponding to the multiple objects to obtain the recommendation reason generation model, so that a recommendation reason generation model with better performance can be quickly obtained.

Figure 5:
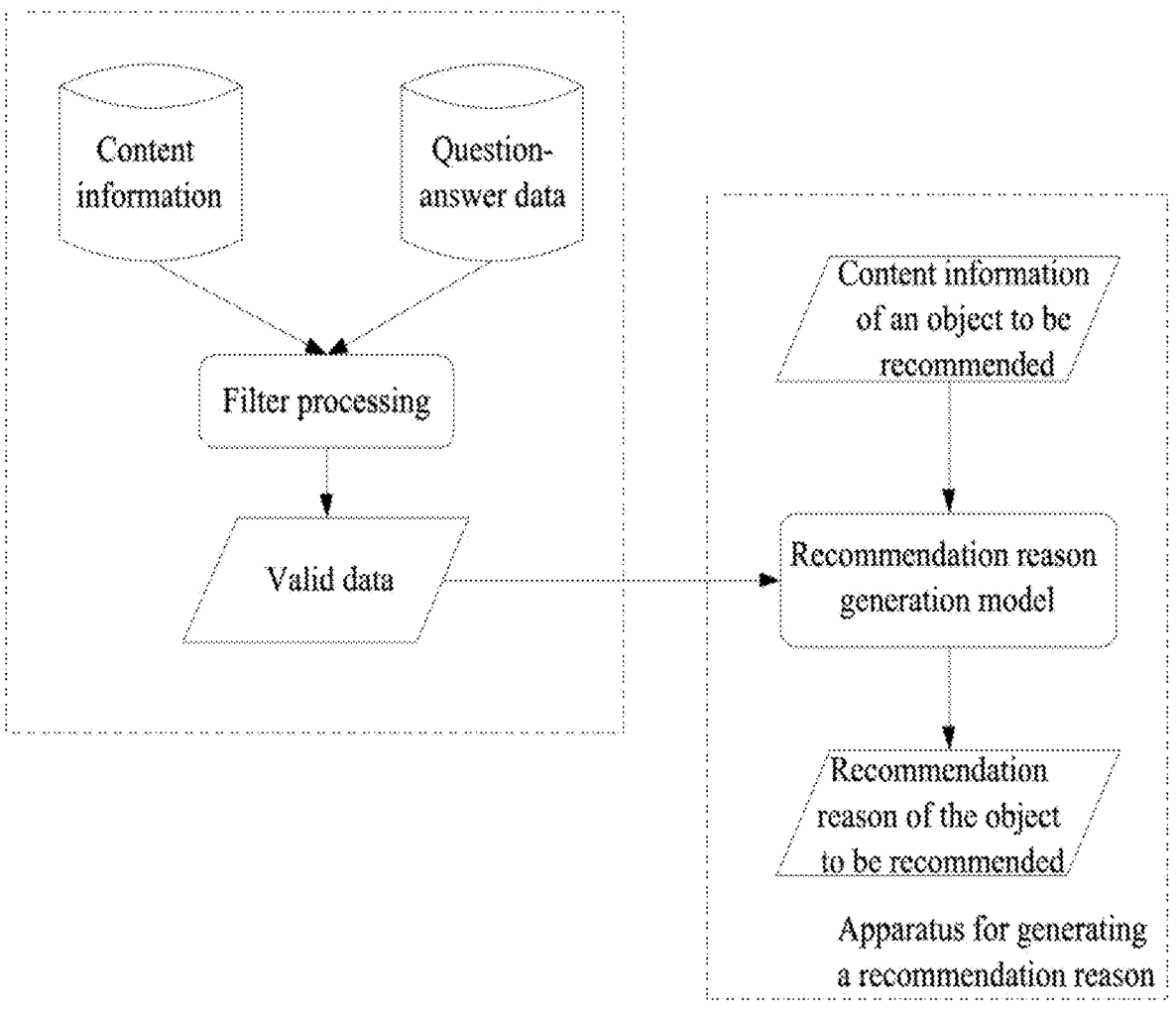
FIG. 5 is a schematic flowchart of a method for generating a recommendation reason provided by yet another embodiment of the present application.

Please refer to FIG. 5, FIG. 5 is a schematic flowchart of a method for generating a recommendation reason provided by another embodiment of the present application, which specifically includes the following steps: acquiring content information of multiple objects: acquiring question-answer data of the multiple objects: filtering the content information and the question-answer data of the multiple objects to obtain valid data: using the valid data to train an initial network to obtain the recommendation reason generation model: acquiring the content information of the object to be recommended, and obtaining the recommendation reason of the object to be recommended through the recommendation reason generation model processing. Where the dotted box on the left is used to acquire the training data, the dotted box on the right is the function to be implemented by the recommendation reason generation apparatus, reference may be made to subsequent embodiments for the relevant description of the recommendation reason generation apparatus, which will not be repeated here.

Next, the specific composition of the initial model is introduced. The initial model includes:

a prior network module, configured to obtain a first recommendation reason according to a content information vector;

a posterior network module, configured to obtain a second recommendation reason according to the content information vector and a question-answer data vector; and a decoding module, configured to obtain a predicted recommendation reason according to the first recommendation reason, the second recommendation reason and a target recommendation reason.

Further, the initial model also includes: a loss function calculating module. the loss function calculating module is configured for at least one of the following purposes:

obtaining a first loss function according to the question-answer data vector and the target recommendation reason, the first loss function being used to indicate to adjust a relevant parameter in the decoding module;

obtaining a second loss function according to the predicted recommendation reason and the target recommendation reason, the second loss function being used to indicate to adjust a relevant parameter in the decoding module; and obtaining a third loss function according to the first recommendation reason and the second recommendation reason, the third loss function being used to indicate to adjust a relevant parameter in the prior network module and/or relevant parameters in the posterior network module.

Figure 6:
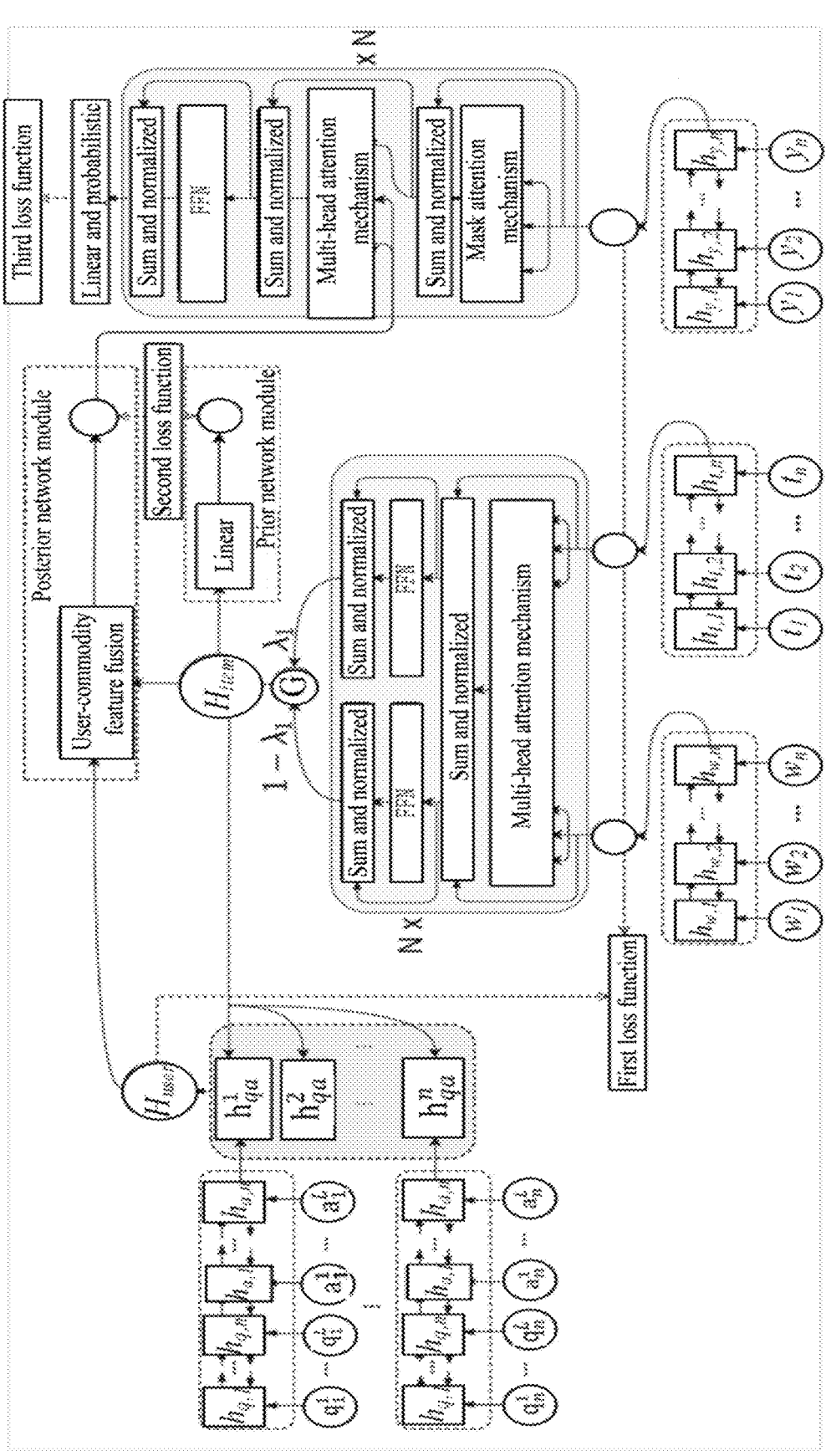
FIG. 6 is a schematic diagram of a training process of a recommendation reason generation model provided by an embodiment of the present application.

Exemplarily, a training process of the recommendation reason generation model is shown in FIG. 6. Referring to FIG. 6, the training process is as follows.

1. Taking the title and the attribute of the commodity as the input of the preset encoder, as shown in the lower part of FIG. 6 to obtain a vector representation of the title and the attribute. Specifically, setting the attribute as $W=\{w_1, \ldots, w_n\}$, and using the bidirectional LSTM encoder to represent the attribute as a fixed vector representation $h_W=\{h_{W,1}, \ldots, h_{W,n}\}$: furthermore, setting the title as $T=\{t_1, \ldots, t_n\}$, and using the bidirectional LSTM encoder to represent the title as a fixed vector representation $h_T=\{h_{t,1}, \ldots, h_{t,n}\}$.

2. Through a self-attention mechanism module, performing linear superimposition on the title vector and the attribute vector, as shown in the middle of FIG. 6, and finally obtaining the content information vector. Specifically, taking the title vector $h_T$ and the attribute vector $h_W$ as initialization inputs $$E_T^0$$

and $$E_W^0,$$

then self-attention of an l-th layer is expressed as:

$$E_T^l = FFN\left(MHA\left(E_T^{l-1}, E_T^{l-1}, E_T^{l-1}\right)\right)$$

$$E_W^l = FFN\left(MHA\left(E_W^{l-1}, E_W^{l-1}, E_W^{l-1}\right)\right)$$

where FFN represents a forward neural network, and MHA represents a multi-head self-attention mechanism.

The final content information vector is expressed as:

$$H_{item} = \lambda_1 E_T^N + (1 - \lambda_1) E_W^N$$

where $\lambda_1$ represents a linear adjustment parameter, $$E_T^N$$

and $$E_W^N$$

represent outputs of the last layer (i.e., Nth layer) multi-head attention mechanism.

3. The question-answer data corresponding to the commodity, including a question sentences and answer sentences, is used as the input of the preset encoder, as shown on the left side of FIG. 6, to obtain a vector representation of the question-answer data. Specifically, given i-th question-answer data as $qa=\{q_1, \ldots, q_n, a_1, \ldots, a_n\}$, we still use the bidirectional LSTM encoder to represent the question-answer data as haa.

Specifically, given the question-answer data of the commodity, answers corresponding to the question in the question-answer data are spliced together, and the question-answer data is encoded by the bidirectional LSTM encoder as the vector representation of the question-answer data.

4. Through a guidance mechanism of the content information, weights of different question-answer data are finally obtained, and the vector representation of the question-answer data is obtained after synthesis. Specifically, given a representation set for each question-answer data as $$\{h_{qa}^1, \ldots, h_{qa}^n\},$$

the vector representation of the question-answer data is:

$$H_{user} = \sum_{k=1}^n \delta_k^{qa} h_{qa}^k$$

$$\delta_k^{qa} = \mathrm{softmax}\left((W_1 H_{item} + b_1)^T \left(W_2 h_{qa}^k + b_2\right)\right)$$

where $W_1$, $W_2$, $b_1$ and $b_2$ are parameters learned by the model.

In order to obtain a final representation of the question-answer data for the commodity, the content information of the commodity is integrated into the question-answer data to guide the vector representation of the question-answer data for the commodity. The content information vector of the commodity is linearly transformed, and each question-answer data vector is linearly transformed, and the two linearly transformed vectors are multiplied, and the weight of the question-answer data is obtained through a softmax function. Finally, the vector representation of the question-answer data is obtained by multiplying the weight and the question-answer data.

5. The posterior network module takes the content information and the question-answer data of the commodity as input, and takes the recommendation reason as output, that is, $\tilde{H}_{post}=\sigma(W_4 [H_{item}, H_{user}]+b_4)$: the prior network module takes the content information of the commodity as input, and takes the recommendation reason as output, that is, $\tilde{H}_{prio}=\sigma(W_3 H_{item}+b_3)$. As shown in the upper part of FIG. 6, a KL distance is used to make the prior network module infinitely close to the posterior network module, that is, $\mathcal{L}_{KL}(\theta)=D_{KL}(p(y_t|\tilde{H}_{post})\|p(y_t|\tilde{H}_{prio}); \theta)$.

Where $W_3$, $W_4$, $b_3$ and $b_4$ are parameters learned by the model.

The content information vector of the commodity is spliced with the question-answer data vector of the commodity, and a representation of the posterior network module is obtained through a multilayer perceptron, and the representation is input into the decoding module. Using only the content information vector of the commodity and through the same multilayer perceptron, a representation of the prior network module is obtained, and the representation is input into the decoding module. Through the KL distance, the posterior network module and the prior network module are made to be infinitely close, thereby achieving the purpose of training the network.

6. The decoding module uses the standard transformer model for decoding, and the structure of the decoding module is shown in the right part of FIG. 6.

The target of the model training includes three parts, namely the KL distance of the prior-posterior network (that is, the third loss function), a KLL loss function of the recommendation reason generated by the posterior network module (that is, the second loss function), and an REG loss function of the recommendation reason generated by the question-answer data (that is, the first loss function). Specifically, $$\mathcal{L}_{NNL}(\theta) = -\sum_{t=1}^{S} \log p(y_t \mid y_{<t}, T, W, \{QA\}; \theta)$$

where $y_{<t}$ represents a word that has been generated, and $\theta$ represents a model parameter.

$$\mathcal{L}_{REG}(\theta) = -\sum_{t=1}^{S} \log p(y_t \mid H_{user}; \theta)$$

A final loss function is expressed as:

$$\mathcal{L}(\theta) = \mathcal{L}_{KL}(\theta) + \mathcal{L}_{NNL}(\theta) + \mathcal{L}_{REG}(\theta)$$

The recommendation reason is generated based on the transformer model, where the pre-training model may be configured to further optimize the vocabulary, enhance the relational modeling of the data, and thus improve the effectiveness of the recommendation reason.

Still taking the above example in which the title is "LED rechargeable night light" and the attribute is "Chargeable, Light, Large capacity" as an example, the 256-dimensional content information vector is used as the input of the decoding module, and the output is a normalized vector of a vocabulary size, each dimension corresponds to a Chinese character, and the probability distribution of each character is obtained step by step. The recommendation reason is generated in a manner of beam search.

For example, 3 characters with the maximum probability of beam=3 in a first decoding are "Charge, Small, Large", and the five characters are respectively used as the input of the decoding module for the next step of decoding. Taking "Charge" as the input to obtain "Electricity, Gas, Full", taking "Small" as the input to obtain "Exquisite, Child, Hour", taking "Big" as the input to obtain "Capacity, Point, Number", comprehensively comparing the probability of "Charge electricity, Charge gas, Charge full, Small and exquisite, Small child, Small hour, Big capacity, Big point, Big number", and selecting the top three words "Charge electricity, Small and exquisite, Big capacity." as a root node, and proceeding to the next step of decoding. Finally, among the top three phrases obtained, the one with the highest probability is selected as the generated recommendation reason, such as "Small, Convenient and Accommodatable".

The present application proposes an automatic generation scheme for the recommendation reason based on user question-answer data, that is, a method for generating a recommendation reason using a hierarchical multi-source posterior network. For the recommendation reason generation of non-hot-selling commodities, in the present application, the memory feature of the posterior network module is utilized, thus generating the recommendation reason that meets users' needs through the title and the attribute of the commodity.

In addition, the detailed modeling of the relationship between questions and answers in the question-answer data can effectively improve the mining accuracy of the question-answer data.

Apparatus embodiments of the present application will be described in the following, which can be used to execute the method embodiments of the present application. For details not disclosed in the apparatus embodiments of the present application, please refer to the method embodiments of the present application.

Figure 7:
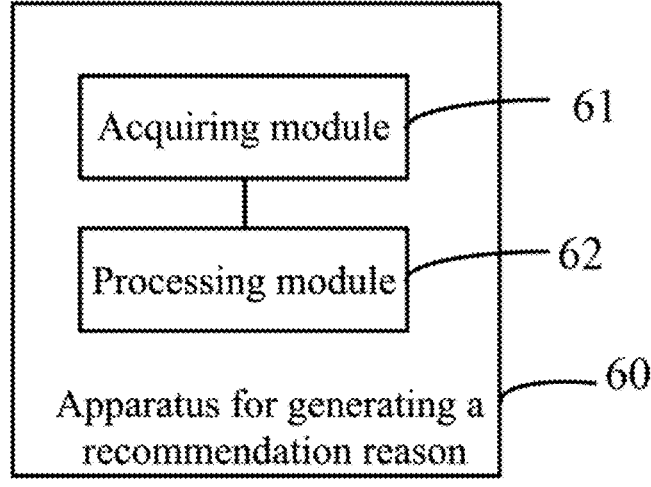
FIG. 7 is a schematic structural diagram of an apparatus for generating a recommendation reason provided by an embodiment of the present application.

FIG. 7 is a schematic structural diagram of an apparatus for generating a recommendation reason provided by an embodiment of the present application. The embodiment of the present application provides the apparatus for generating a recommendation reason, and the apparatus may be integrated on an electronic device such as a server, or the apparatus may be integrated on a chip of the electronic device, or the apparatus may also be the electronic device. As shown in FIG. 7, the apparatus for generating a recommendation reason 60 includes: an acquiring module 61 and a processing module 62, where:

the acquiring module 61, configured to acquire content information of an object to be recommended; and the processing module 62, configured to generate the recommendation reason of the object to be recommended according to a pre-trained recommendation reason generation model and the content information, the training data used by the recommendation reason generation model including question-answer data and content information of multiple objects.

In a possible implementation, the processing module 62 is specifically configured to: encode the content information by using the preset encoder to obtain a content information vector: generate the recommendation reason of the object to be recommended according to the pre-trained recommendation reason generation model and the content information vector.

Further, the content information may include a title and an attribute. Correspondingly, when being configured to encode the content information by using the preset encoder to obtain the content information vector, the processing module 62 is configured to: encode the title and the attribute by using the preset encoder respectively to obtain a title vector and an attribute vector: obtain the content information vector according to the title vector, the attribute vector and a preset weight.

Exemplarily, the preset encoder may include at least one of the following encoders: a bidirectional LSTM encoder, a unidirectional LSTM encoder, a transformer model, or the like.

In some embodiments, the acquiring module 61 may be further configured to:

acquire the training data; and train an initial model based on the training data and a target recommendation reason corresponding to the multiple objects to obtain the recommendation reason generation model.

Further, when being configured to acquire the training data, the acquiring module 61 can be configured to:

acquire the content information of the multiple objects;

acquire the question-answer data of the multiple objects; and filter the question-answer data and the content information to obtain valid data.

Correspondingly, when being configured to train the initial model based on the training data and the target recommendation reason corresponding to the multiple objects to obtain the recommendation reason generation model, the acquiring module 61 is configured to: train the initial model based on the content information of the multiple objects, the valid data and the target recommendation reason corresponding to the multiple objects to obtain the recommendation reason generation model.

In any of the above embodiments, the initial model may include:

a content information module, configured to encode content information to obtain a content information vector;

a question-answer data module, configured to obtain a question-answer data vector according to the content information vector and question-answer data;

a prior network module, configured to obtain a first recommendation reason according to the content information vector;

a posterior network module, configured to obtain a second recommendation reason according to the content information vector and the question-answer data vector; and a decoding module, configured to obtain a predicted recommendation reason according to the first recommendation reason, the second recommendation reason and a target recommendation reason.

Further, the initial model may further include:

a loss function calculating module, configured for at least one of the following purposes:

obtaining a first loss function according to the question-answer data vector and the target recommendation reason, the first loss function being used to indicate to adjust a relevant parameter in the decoding module;

obtaining a second loss function according to the predicted recommendation reason and the target recommendation reason, the second loss function being used to indicate to adjust a relevant parameter in the decoding module; and obtaining a third loss function according to the first recommendation reason and the second recommendation reason, the third loss function being used to indicate to adjust a relevant parameter in the prior network module and/or a relevant parameter in the posterior network module.

It should be noted that, it should be understood that the division of the modules of the above apparatus is only a division of logical function, which may be fully or partially integrated into a physical entity in actual implementations, or may be physically separated. In addition, the modules may all be implemented in the form of software calling through processing elements: they may also all be implemented in hardware: some modules may also be implemented in the form of calling software through processing elements, and some modules may be implemented in hardware. For example, the processing module may be a separately established processing element, or may be integrated into a certain chip of the above apparatus for implementation, in addition, it may also be stored in the memory of the above apparatus in the form of program codes, and the function of the above processing module is called and executed by a certain processing element of the above apparatus. The implementation of other modules is similar. In addition, all or part of these modules may be integrated together, and may also be implemented independently. The processing element described here may be an integrated circuit with signal processing capabilities. In the implementation process, each step of the above method or each of the above modules may be completed by an integrated logic circuit of hardware in the processor element or an instruction in the form of software.

For example, the above modules may be one or more integrated circuits configured to implement the above methods, such as: one or more application specific integrated circuits (ASIC), or one or more microprocessors (Digital Signal Processor, DSP), or one or more field programmable gate array (FPGA) and so on. For another example, when one of the above modules is implemented in the form of a processing element scheduling program codes, the processing element may be a general-purpose processor, such as a central processing unit (CPU) or other processors that can call program codes. For another example, these modules may be integrated together and implemented in the form of a system-on-a-chip (SOC).

In the above embodiments, it may be implemented in whole or in part by software, hardware, firmware or any combination thereof. When implemented in software, it may be implemented in whole or in part in the form of a computer program product. The computer program product includes one or more computer instructions. When the computer program instructions are loaded and executed on a computer, all or part of the processes or functions described in the embodiments of the present application are generated. The computer may be a general purpose computer, a special purpose computer, a computer network, or other programmable apparatus. The computer instructions may be stored in a computer-readable storage medium, or transmitted from one computer readable storage medium to another computer readable storage medium. For example, the computer instructions may be transmitted from one website site, one computer, one server, or one data center to another website site, another computer, another server, or another data center by wire (e.g., a coaxial cable, a fiber optic, a digital subscriber line (DSL)) or wireless (e.g., infrared, wireless, microwave, etc.). The computer-readable storage medium may be any available medium that can be accessed by the computer or a data storage device such as a server, a data center, or the like that includes one or more available medium integrations. The available medium may be a magnetic medium (e.g., a floppy disk, a hard disk, a magnetic tape), an optical medium (e.g., DVD), or a semiconductor medium (e.g., a solid state disk (SSD)), and the like.

Figure 8:
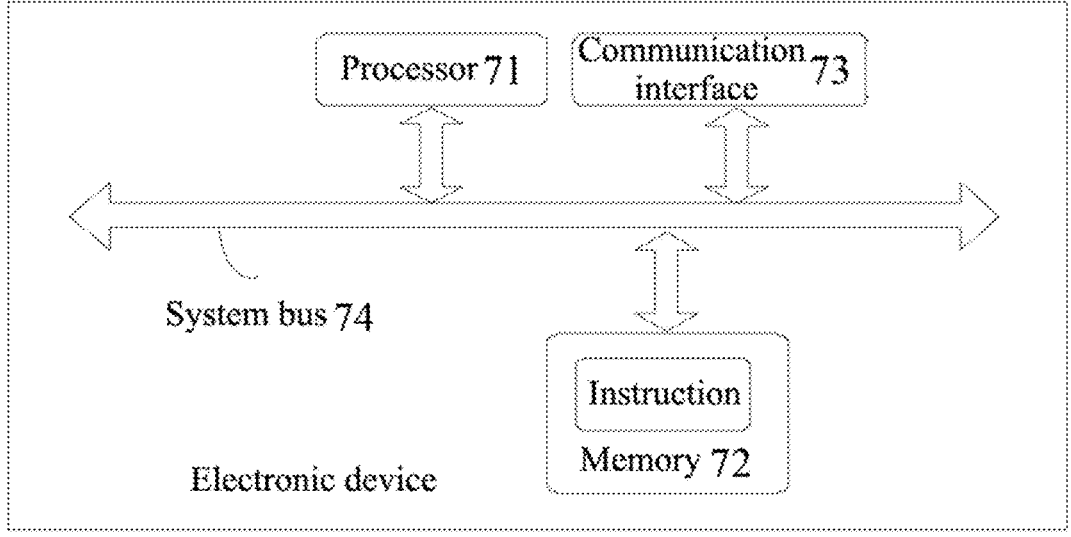
FIG. 8 is a schematic structural diagram of an electronic device provided by an embodiment of the present application.

FIG. 8 is a schematic structural diagram of an electronic device provided by an embodiment of the present application. As shown in FIG. 8, the electronic device may include: a processor 71, a memory 72, a communication interface 73 and a system bus 74. Where the memory 72 and the communication interface 73 are connected to the processor 71 through the system bus 74 and complete mutual communication, the memory 72 is configured to store computer-executable instructions, the communication interface 73 is configured to communicate with other devices, and the processor 71 implements the solutions described in the above method embodiments when executing the above computer-executable instructions.

The system bus mentioned in FIG. 8 may be a peripheral component interconnect (PCI) bus or an extended industry standard architecture (EISA) bus or the like. The system bus may be divided into an address bus, a data bus, a control bus and so on. For ease of presentation, only one thick line is used in the figure, but it does not mean that there is only one bus or one type of bus. The communication interface is configured to realize communication between a database access device and other devices (such as a client, a read-write library and a read-only library). The memory may include a random access memory (RAM), and may also include a non-volatile memory, such as at least one disk memory.

The above processor may be a general-purpose processor, including a central processing unit CPU, a network processor (NP), etc.: it may also be a digital signal processor DSP, an application specific integrated circuit ASIC, a field programmable gate array FPGA or other programmable logic devices, a discrete gate or a transistor logic device, and a discrete hardware component.

In a possible implementation, an embodiment of the present application further provides a computer-readable storage medium, where computer-executable instructions are stored in the computer-readable storage medium, and when the computer-executed instructions are run on the computer, the computer is caused to execute the method described in the above method embodiments.

In a possible implementation, an embodiment of the present application further provides a chip for running an instruction, and the chip is configured to execute the method as described in the above method embodiments.

An embodiment of the present application further provides a computer program product, where the computer program product includes a computer program, where the computer program is stored in the computer-readable storage medium, and at least one processor can read the computer program from the computer-readable storage medium, and the at least one processor implements the above method embodiments when executing the computer program.

In the present application, "at least one" means one or more, and "multiple" means two or more. "And/or", which describes the association relationship of the associated objects, means that there may be three kinds of relationships. For example, A and/or B may mean that A exists alone, A and B exist simultaneously, and B exists alone, where A and B may be singular or plural. The character "/" generally means that the associated objects are in an "or" relationship: in the formula, the character "/" means that the associated objects before and after are in a "division" relationship. "At least one of the following" or its similar expression means any combination of these items, including any combination of single item or plural items. For example, at least one of a, b, or c may represent: a, b, c, a-b, a-c, b-c, or a-b-c, where a, b, c may be single or multiple.

It can be understood that the various numeral numbers involved in the embodiments of the present application are only for the convenience of description, and are not used to limit the scope of the embodiments of the present application. In the embodiments of the present application, the sequence numbers of the above processes do not mean the sequence of execution, and the execution sequence of each process should be determined by its functions and internal logic, and should not constitute any limitation on the implementation process of the embodiments of the present application.

Finally, it should be noted that the above embodiments are only used to illustrate the technical solution of the present application, but not to limit it: although the present application has been described in detail with reference to the above embodiments, those of ordinary skill in the art should understand that: the technical solution described in the above embodiments may still be modified, or some or all of the technical features thereof may be equivalently replaced; however, these modifications or replacements do not make the essence of the corresponding technical solution deviate from the scope of the technical solution of the embodiments of the present application.

The invention claimed is:

1. A method for generating a recommendation reason, applied to a server, comprising:

acquiring content information of an object to be recommended; and generating the recommendation reason of the object to be recommended according to a pre-trained recommendation reason generation model and the content information, training data used by the recommendation reason generation model comprising question-answer data and content information of multiple objects;

wherein before the generating the recommendation reason of the object to be recommended according to the pre-trained recommendation reason generation model and the content information, the method further comprises:

acquiring the training data; and training an initial model based on the training data and a target recommendation reason corresponding to the multiple objects to obtain the recommendation reason generation model;

wherein the initial model comprises:

a prior network module, configured to obtain a first recommendation reason according to a content information vector;

a posterior network module, configured to obtain a second recommendation reason according to the content information vector and a question-answer data vector; and a decoding module, configured to obtain a predicted recommendation reason according to the first recommendation reason, the second recommendation reason and a target recommendation reason;

wherein the initial model further comprises:

a loss function calculating module, configured for at least one of the following purposes:

obtaining a first loss function according to the question-answer data vector and the target recommendation reason, the first loss function being used to indicate to adjust a relevant parameter in the decoding module;

obtaining a second loss function according to the predicted recommendation reason and the target recommendation reason, the second loss function being used to indicate to adjust a relevant parameter in the decoding module; and obtaining a third loss function according to the first recommendation reason and the second recommendation reason, the third loss function being used to indicate to adjust a relevant parameter in the prior network module and/or a relevant parameter in the posterior network module;

wherein the first loss function is an REG loss function of the recommendation reason generated by the question-answer data, the second loss function is a KLL loss function of the recommendation reason generated by the posterior network module, and the third loss function is a KL distance of the prior network module and the posterior network module, wherein the KL distance is used to make the prior network module infinitely close to the posterior network module;

wherein a final loss function is a sum of the first loss function, the second loss function and the third loss function, and the final loss function is used for training the initial model.

2. The method according to claim 1, wherein the generating the recommendation reason of the object to be recommended according to the pre-trained recommendation reason generation model and the content information comprises:

encoding the content information by using a preset encoder to obtain a content information vector; and generating the recommendation reason of the object to be recommended according to the pre-trained recommendation reason generation model and the content information vector.

3. The method according to claim 2, wherein the content information comprises a title and an attribute, the encoding the content information by using the preset encoder to obtain the content information vector comprises:

encoding the title and the attribute by using the preset encoder respectively to obtain a title vector and an attribute vector; and obtaining the content information vector according to the title vector, the attribute vector and a preset weight.

4. The method according to claim 2, wherein the preset encoder comprises at least one of the following encoders:

a bidirectional long short-term memory network (LSTM) encoder, a unidirectional LSTM encoder or a transformer model.

5. The method according to claim 1, wherein the acquiring the training data comprises:

acquiring the content information of the multiple objects;

acquiring the question-answer data of the multiple objects;

filtering the question-answer data and the content information to obtain valid data; and correspondingly, the training the initial model based on the training data and the target recommendation reason corresponding to the multiple objects to obtain the recommendation reason generation model comprises:

training the initial model based on the content information of the multiple objects, the valid data and the target recommendation reason corresponding to the multiple objects to obtain the recommendation reason generation model.

6. An apparatus for generating a recommendation reason, comprising a memory and a processor:

the memory is configured to store program instructions; and the processor is configured to invoke the program instructions in the memory to:

acquire content information of an object to be recommended; and generate the recommendation reason of the object to be recommended according to a pre-trained recommendation reason generation model and the content information, the training data used by the recommendation reason generation model comprising question-answer data and content information of multiple objects;

wherein the processor is further configured to:

acquire the training data; and train an initial model based on the training data and a target recommendation reason corresponding to the multiple objects to obtain the recommendation reason generation model;

wherein the initial model comprises:

a prior network module, configured to obtain a first recommendation reason according to a content information vector;

a posterior network module, configured to obtain a second recommendation reason according to the content information vector and a question-answer data vector; and a decoding module, configured to obtain a predicted recommendation reason according to the first recommendation reason, the second recommendation reason and a target recommendation reason;

wherein the initial model further comprises:

a loss function calculating module, configured for at least one of the following purposes:

obtaining a first loss function according to the question-answer data vector and the target recommendation reason, the first loss function being used to indicate to adjust a relevant parameter in the decoding module;

obtaining a second loss function according to the predicted recommendation reason and the target recommendation reason, the second loss function being used to indicate to adjust a relevant parameter in the decoding module; and obtaining a third loss function according to the first recommendation reason and the second recommendation reason, the third loss function being used to indicate to adjust a relevant parameter in the prior network module and/or a relevant parameter in the posterior network module;

wherein the first loss function is an REG loss function of the recommendation reason generated by the question-answer data, the second loss function is a KLL loss function of the recommendation reason generated by the posterior network module, and the third loss function is a KL distance of the prior network module and the posterior network module, wherein the KL distance is used to make the prior network module infinitely close to the posterior network module;

wherein a final loss function is a sum of the first loss function, the second loss function and the third loss function, and the final loss function is used for training the initial model.

7. The apparatus according to claim 6, wherein the processor is configured to:

encode the content information by using a preset encoder to obtain a content information vector; and generate the recommendation reason of the object to be recommended according to the pre-trained recommendation reason generation model and the content information vector.

8. The apparatus according to claim 7, wherein the content information comprises a title and an attribute, when being configured to encode the content information by using the preset encoder to obtain the content information vector, the processor is configured to:

encode the title and the attribute by using the preset encoder respectively to obtain a title vector and an attribute vector; and obtain the content information vector according to the title vector, the attribute vector and a preset weight.

9. The apparatus according to claim 7, wherein the preset encoder comprises at least one of the following encoders:

the bidirectional long short-term memory network (LSTM) encoder, the unidirectional LSTM encoder or the transformer model.

10. The apparatus according to claim 6, wherein when being configured to acquire the training data, the processor is configured to:

acquire the content information of the multiple objects;

acquire the question-answer data of the multiple objects;

filter the question-answer data and the content information to obtain valid data; and correspondingly, when being configured to train the initial model based on the training data and the target recommendation reason corresponding to the multiple objects to obtain the recommendation reason generation model, the processor is configured to:

train the initial model based on the content information of the multiple objects, the valid data and the target recommendation reason corresponding to the multiple objects to obtain the recommendation reason generation model.

11. A non-transitory computer readable storage medium, wherein a computer program is stored on the readable storage medium; when the computer program is executed, following operations are implemented:

acquiring content information of an object to be recommended; and generating the recommendation reason of the object to be recommended according to a pre-trained recommendation reason generation model and the content information, training data used by the recommendation reason generation model comprising question-answer data and content information of multiple objects;

wherein before the generating the recommendation reason of the object to be recommended according to the pre-trained recommendation reason generation model and the content information, the method further comprises:

acquiring the training data; and training an initial model based on the training data and a target recommendation reason corresponding to the multiple objects to obtain the recommendation reason generation model;

wherein the initial model comprises:

a prior network module, configured to obtain a first recommendation reason according to a content information vector;

a posterior network module, configured to obtain a second recommendation reason according to the content information vector and a question-answer data vector; and a decoding module, configured to obtain a predicted recommendation reason according to the first recommendation reason, the second recommendation reason and a target recommendation reason;

wherein the initial model further comprises:

a loss function calculating module, configured for at least one of the following purposes:

obtaining a first loss function according to the question-answer data vector and the target recommendation reason, the first loss function being used to indicate to adjust a relevant parameter in the decoding module;

obtaining a second loss function according to the predicted recommendation reason and the target recommendation reason, the second loss function being used to indicate to adjust a relevant parameter in the decoding module; and obtaining a third loss function according to the first recommendation reason and the second recommendation reason, the third loss function being used to indicate to adjust a relevant parameter in the prior network module and/or a relevant parameter in the posterior network module;

wherein the first loss function is an REG loss function of the recommendation reason generated by the question-answer data, the second loss function is a KLL loss function of the recommendation reason generated by the posterior network module, and the third loss function is a KL distance of the prior network module and the posterior network module, wherein the KL distance is used to make the prior network module infinitely close to the posterior network module;

wherein a final loss function is a sum of the first loss function, the second loss function and the third loss function, and the final loss function is used for training the initial model.

12. The method according to claim 1, wherein the generating the recommendation reason of the object to be recommended according to the pre-trained recommendation reason generation model and the content information comprises:

encoding the content information by using a preset encoder comprising at least one of a bidirectional long short-term memory network (LSTM) encoder, a unidirectional LSTM encoder, or a transformer model to obtain a content information vector; and generating the recommendation reason of the object to be recommended according to the pre-trained recommendation reason generation model and the content information vector.

13. The method according to claim 12, wherein the pre-trained recommendation reason generation model comprises:

a prior network module configured to obtain a first recommendation reason according to the content information vector;

a posterior network module configured to obtain a second recommendation reason according to the content information vector and a question-answer data vector derived from the question-answer data; and a decoding module configured to obtain the recommendation reason according to the first recommendation reason and the second recommendation reason.

* * * * *